March 6, 1945.  B. G. CARLSON  2,370,776
RIVETING APPARATUS
Filed Aug. 25, 1943
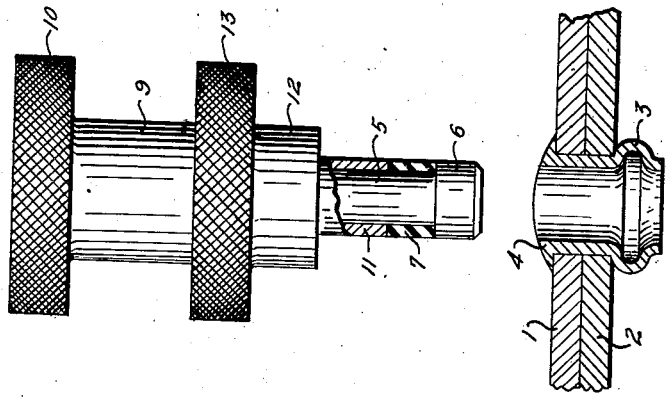
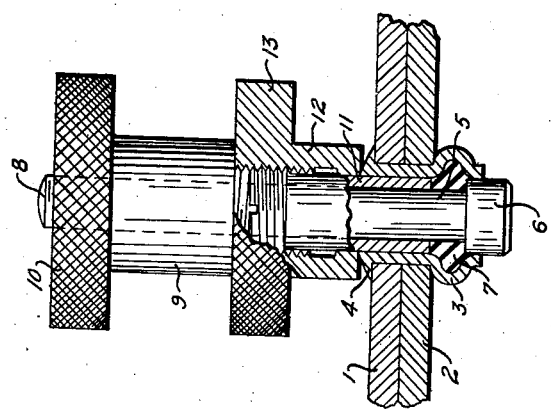
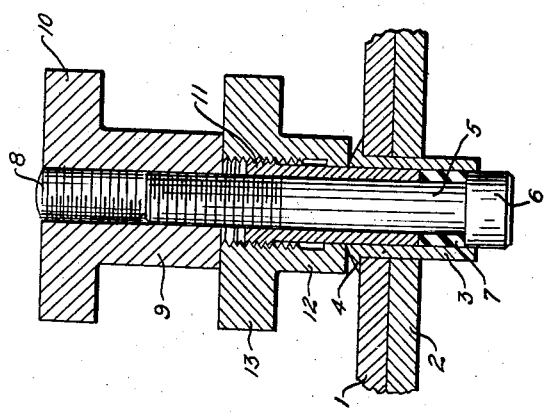
INVENTOR.
BERT G. CARLSON
BY
Frank H. Harmon
ATTORNEY Patented Mar. 6, 1945

2,370,776

UNITED STATES PATENT OFFICE 2,370,776

RIVETING APPARATUS

Bert G. Carlson, Erieside, Ohio, assignor, by mesne assignments, to Jack & Heintz, Inc., Cleveland, Ohio, a corporation of Ohio Application August 25, 1943, Serial No. 499,932

2 Claims. (Cl. 218—19)

This invention relates to improvements in means for expanding rivets and has for its primary object to provide a manually operable blind rivet set, by the use of which the rivet may be inserted in an appropriate hole in the pieces to be riveted together, the rivet expanding tool inserted in the rivet and after simple expanding operation be removed from the rivet for subsequent expanding operations on other rivets.

With this in mind, it is proposed to provide a rivet expanding tool to include a spindle with an enlarged head at one end to retain a removable rubber sleeve, an adjustable nut and a turning knob for moving the spindle longitudinally so as to force the rubber sleeve to uniformly expand the rivet. In this manner the turning of the knob in the opposite direction will allow the removal of the tool from the rivet.

With the foregoing and other objects in view, the invention resides in the combination of parts and in the details of construction hereinafter set forth in the following specification and appended claims, certain embodiments thereof being illustrated in the accompanying drawing, in which:

Figure 1 is a view in vertical section taken through the tool, rivet and two adjoining pieces to be riveted together, and showing the tool inserted in the rivet prior to expansion of the latter;

Figure 2 is a view of the tool partly in elevation and partly in vertical section, showing the rivet flared; and Figure 3 is a view in vertical section of the flared rivet and showing the tool partly in elevation and partly in vertical section and removed from the flared rivet.

Referring more particularly to the drawing, the two pieces to be riveted together are shown at 1 and 2. The invention having more primarily to do with blind riveting, it may be assumed that the underneath side of piece 2 is inaccessible. By means of the tool to be described the rivet 3, to be flared, may be inserted into a hole extending through pieces 1 and 2 until its flange 4 rests on piece 1.

The tool includes a spindle 5 with an enlarged head 6 to retain a removable rubber sleeve 7. Spindle 5 has a screw threaded portion 8 to be engaged by the barrel 9 of a hand knob 10. The spindle loosely extends through a bushing 11 screw-threadedly adjustable within a barrel 12 having a knurled knob 13.

In operation, and as viewed in Figure 1, the rubber sleeve 7 is confined between the enlarged head 6 and the bushing 11 around the spindle 5 as well as the rivet 3 through which it protrudes. The knob 10 has been screwed down on the spindle screw threads 8 and barrel 9 is abutting the upper surface of knob 13.

A further turning of knob 10 in a clockwise direction draws the spindle upwardly. The result of such movement is to distort the rubber sleeve by placing it under compression in the smaller vertical space between head 6 and bushing 11. The rubber sleeve, having no avenue of escape, exerts an outward force on the rivet and bows the main portion thereof, as shown in Figure 2, which represents the position of the assembly when the rivet has been fully expanded and pieces 1 and 2 completely riveted together.

This having been accomplished, the tool may be removed by first turning knob 10 counter-clockwise which relieves the vertical clamping pressure of bushing 11 and head 8 on rubber sleeve 7 until it resumes its original normal shape, as shown in Figures 1 and 3 while the rivet remains flared as shown in Figures 2 and 3. The tool, having been removed, as shown in Figure 3, is then in readiness for subsequent operation on other rivets. The purpose of the adjustability of bushing 11 is to adjust the normal distance between the bushing and head 6 in order to predetermine the expansion of the rivet and the dimensions of the rubber sleeve for proper rivet flaring operations.

By reason of the simple, effective, quick-acting and readily removable tool, each rivet may be quickly flared, the tool removed and the operation repeated on other rivets regardless of the blind and inaccessible nature of rivet location.

I claim:

1. A tool for compressing and flaring a blind hollow rivet having one preformed flared end and its other end straight and unflared to hold two pieces of material together comprising a spindle with an enlarged head insertable through the rivet, a sleeve of elastic deformable material slidable on said spindle and of a normal diameter substantially equal to that of said head to be retained thereby against movement in one direction on said spindle, a bushing of like diameter to said sleeve slidably carried on said spindle on the other side of said sleeve and also insertable in said rivet, a manually turnable barrel screw threadedly connected to said bushing to abut the preformed end of the rivet and adjustable longitudinally of said bushing to adjust the relationship between said enlarged head and sleeve and the lower end of said rivet, and a second hand turnable barrel screw threadedly connected to said spindle for drawing said head toward said bushing to predeterminedly deform said sleeve and thus expand and flare the under, or blind, portion of said rivet to force said two pieces of material together and retain the same in such relationship.

2. A tool for compressing and flaring a blind hollow rivet having one preformed flared end and its other end straight and unflared to hold two pieces of material together comprising a spindle with an enlarged head insertable through the rivet, a sleeve of elastic deformable material slidable on said spindle and of a normal diameter substantially equal to that of said head to be retained thereby against movement in one direction on said spindle, a bushing of like diameter to said sleeve slidably carried on said spindle on the other side of said sleeve and also insertable in said rivet, a manually turnable barrel screw threadedly connected to said bushing to abut the preformed end of the rivet and adjustable longitudinally of said bushing to adjust the relationship between said enlarged head and sleeve and the lower end of said rivet, and a second hand turnable barrel screw threadedly connected to said spindle for drawing said head toward said bushing to predeterminedly deform said sleeve and thus expand and flare the under, or blind, portion of said rivet to force said two pieces of material together and retain the same in such relationship, said second barrel upon a manual turning in the opposite direction being adapted to release the pressure on said sleeve permitting it to resume its normal diameter so that the sleeve and the spindle head may be removed from the flared rivet.

BERT G. CARLSON.